J. HEWITT.
Fluting-Irons.
No. 5,358. Reissued April 15, 1873.
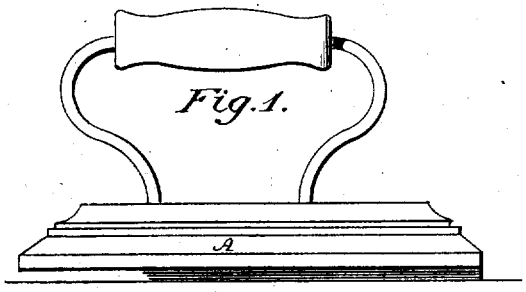
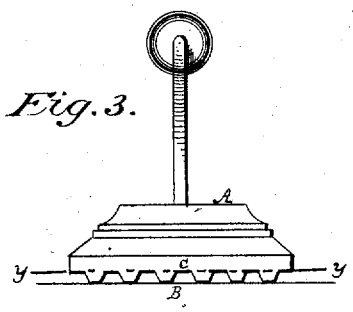
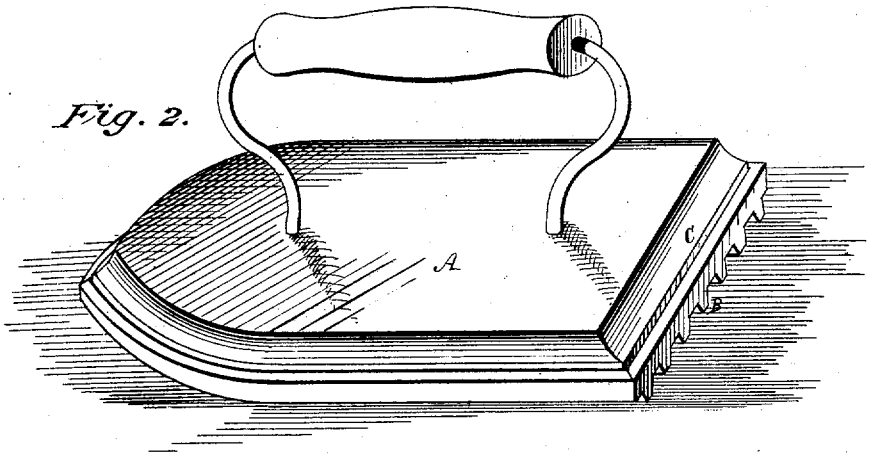
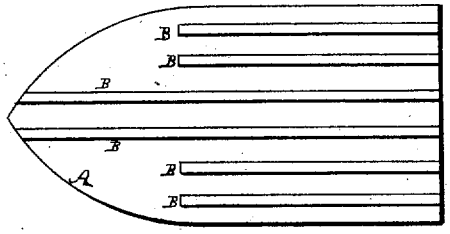
Attest;
Edwin James.
K. V. Gordon
Inventor;
John Hewitt.
per J. P. D. Holmead.
Attorney.
AM. PHOTO-LITHOGRAPHIC CO. N.Y. (OSBORNE'S PROCESS.)

UNITED STATES PATENT OFFICE.

JOHN HEWITT, OF PITTSBURG, PENNSYLVANIA.

IMPROVEMENT IN FLUTING-IRONS.

Specification forming part of Letters Patent No. 135,335, dated January 28, 1873; reissue No. 5,358, dated April 15, 1873; application filed April 8, 1873.

DIVISION B.

*To all whom it may concern:*

Be it known that I, JOHN HEWITT, of Pittsburg, in the county of Allegheny and State of Pennsylvania, have invented a certain new and useful Improvement in Fluting-Irons, which was shown in the drawing forming part of the Letters Patent granted to me January 28, 1873, and numbered 135,335, which improvement I now desire to secure in a separate patent, as provided for in the act of Congress; and I do hereby declare that the following is a full, clear, and exact description of my said improvement, reference being had to the accompanying drawing and to the letters of reference marked thereon.

The nature of my invention consists in a fluting-iron constructed in the form of the ordinary sad-iron having a coniform point, the ironing-face of said iron being provided with fluting-ribs, which extend the whole length of the ironing-face and below the lower plane of the body of the iron, the whole being so constructed that the fluting or ruffling of a piece of goods by said iron may, in conjunction with a fluting-board, be accomplished by giving to the iron a reciprocating motion in contradistinction to the pressing, or the rocking and pressing motion combined, heretofore used in fluting-irons.

To enable others skilled in the art to make and use my invention, I will proceed to describe more fully its construction and operation.

In the accompanying drawing, which forms part of my specification, Figure 1 is a side elevation of my improvement in fluting-iron. Fig. 2 is a perspective view of the same. Fig. 3 is an end elevation of the same. Fig. 4 represents the ironing-surface of the fluting-iron.

The fluting-iron represented in the accompanying drawing is constructed in every respect like the ordinary "sad" or smoothing iron, having a coniform point, except that the ironing-face is provided with a series of ribs, B, which project downward from the body A and below its under plane, as indicated by the line marked *y* in Fig. 3, whereby a sliding or reciprocating motion may be given to the iron, which motion is not limited by any other condition or construction of the iron. In the iron represented in the accompanying drawing, part of the ribs B extend from the "heel" to the "toe" of iron, and part of them extend from the heel to where the taper of the point begins; but I do not confine myself to this arrangement of the ribs B, the main feature of my invention consisting in extending the ribs below the lower plane of the body, as hereinbefore described, so that the iron can, in conjunction with a fluting-board, be operated with the sliding or reciprocating motion unlimited, as in the ordinary sad or smoothing iron, and in contradistinction to the pressing and rocking motion heretofore used in fluting-irons.

By constructing a fluting-iron as hereinbefore described, the ruffling of wearing apparel can be ironed like the other parts of the garment which have undergone the operation of being ironed.

It is well known to the laundress and others that a fine glossy and polished appearance can only be given to washed and starched goods by heated smoothing-irons to which is imparted the sliding, rubbing, and reciprocating motion; and to accomplish the desirable result of giving the ruffling a glossy and polished appearance I have constructed my fluting-iron as herein described.

The fluting-board used in conjunction with the iron should be provided with corrugations corresponding to the corrugations or ribs B of the body A, allowing, however, space for the thickness of the cloth placed between the fluting-board and the fluting-iron.

The laundress will as a general rule use the heel C of the fluting-iron; this I know by experience to be the case; hence I have constructed the iron with ribs extending to where the point of the iron begins, and with ribs extending the whole length of the face of the iron. By this arrangement of the ribs the iron is adapted to the ironing of a single flute, or a series of flutes. By the long ribs B extending to the point of the iron, the corded parts of the dress may be ironed, and the beading and single flutes in ladies' collars and wristbands can be polished and highly finished by the ironing process.

The foregoing and many other advantages, which will be very apparent to the skillful laundress, show the value of my fluting-iron for ruffling.

Having thus described the nature, construction, and operation of my improvement, what I claim as of my invention is—.

A fluting-iron with corrugations extending the entire length of its ironing-surface, the contour of said iron being the same as the ordinary sad or smoothing iron, having a coniform point, substantially as herein described, and for the purpose set forth.

JOHN HEWITT.

Witnesses:
A. C. JOHNSTON,
J. J. JOHNSTON.